(12) United States Patent
Cho et al.

(10) Patent No.: US 8,379,565 B2
(45) Date of Patent: Feb. 19, 2013

(54) METHOD FOR MAPPING SUBBAND/MINIBAND IN WIRELESS COMMUNICATION SYSTEM AND AN APPARATUS THEREFOR

(75) Inventors: Han Gyu Cho, Gyeonggi-do (KR); Seung Hyun Kang, Gyeonggi-do (KR); Jin Sam Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 12/763,657

(22) Filed: Apr. 20, 2010

(65) Prior Publication Data

US 2010/0273497 A1 Oct. 28, 2010

Related U.S. Application Data

(60) Provisional application No. 61/171,461, filed on Apr. 22, 2009, provisional application No. 61/261,370, filed on Nov. 15, 2009, provisional application No. 61/306,944, filed on Feb. 22, 2010.

(30) Foreign Application Priority Data

Mar. 18, 2010 (KR) .................. 10-2010-0024256

(51) Int. Cl.
 *H04B 7/212* (2006.01)
(52) U.S. Cl. ........................ 370/322; 370/480
(58) Field of Classification Search .............. 370/310, 370/315, 316, 321, 322, 328, 329, 343, 344, 370/464, 480; 455/403, 422.1, 455
See application file for complete search history.

(56) References Cited

U.S. PATENT DOCUMENTS

| 2009/0097447 A1* | 4/2009 | Han et al. .............. 370/330 |
| 2010/0312894 A1* | 12/2010 | Awad et al. ............. 709/226 |

FOREIGN PATENT DOCUMENTS

| EP | 1 983 671 A1 | 10/2008 |
| KR | 10-2008-0014880 A | 2/2008 |
| WO | WO 2006/127544 A2 | 11/2006 |
| WO | WO 2009/038350 A1 | 3/2009 |

OTHER PUBLICATIONS

PCT International Search Report and Written Opinion dated Oct. 27, 2010, for Application No. PCT/KR2010/002204.

* cited by examiner

*Primary Examiner* — Obaidul Huq
(74) *Attorney, Agent, or Firm* — Birch, Stewart, Kolasch & Birch, LLP

(57) ABSTRACT

A method for mapping subband/miniband in a wireless communication system and apparatus therefore are disclosed. The present invention includes dividing the system frequency band into a plurality of physical resource units (PRUs) and mapping a plurality of the physical resource units to a subband physical resource unit ($PRU_{SB}$) and a miniband physical resource unit ($PRU_{MB}$), wherein the mapping is based on an interval between contiguous resource units which includes a predetermined number of contiguous PRUs and another interval greater than the former interval and wherein the interval between the contiguous resource units is a roundup value of a value resulting from dividing a maximum number of the contiguous resource units by the number of the contiguous resource units to allocate to the minibands. According to a related art subband/miniband mapping method, if $K_{SB}$ has a greater value, an interval between contiguous PRUs allocated to miniband among total PRUs is narrowed, diversity of the miniband may be lowered. Therefore, the present invention proposes a subband/miniband mapping method for securing diversity gain of miniband by improving the related art subband/miniband mapping method.

14 Claims, 12 Drawing Sheets

METHOD FOR MAPPING SUBBAND/MINIBAND IN WIRELESS COMMUNICATION SYSTEM AND AN APPARATUS THEREFOR

CROSS-REFERENCE TO RELATED APPLICATIONS

Pursuant to 35 U.S.C. §119(a), this application claims the benefit of the priority to Provisional Application No. 61/171,461 filed on Apr. 22, 2009, 61/261,370 filed on Nov. 15, 2009 and 61/306,944 filed on Feb. 22, 2010, which are hereby incorporated by reference as if fully set forth herein.

This application claims the benefit of earlier filing date and right of priority to Korean Application No. 10-2010-0024256 filed on Mar. 18, 2010, the contents of which is hereby incorporated by reference herein in their entirety.

TECHNICAL FIELD

The present invention relates to a wireless communication system, and more particularly, to a method for mapping subband/miniband in a wireless communication system and apparatus therefor.

BACKGROUND ART

First of all, FIG. 1 exemplarily shows a wireless communication system. Referring to FIG. 1, a wireless communications system 100 consists of a plurality of base stations 110 and a plurality of mobile stations 120. The wireless communications system 100 can include a homogeneous network or a heterogeneous network. In this case, the heterogeneous network represents the network in which different network entities including macro cells, femto cells, relays and the like coexist. The base station is a fixed station that communicates with a mobile station in general. And, the base stations 110a, 110b and 110c provide services to specific geographical areas 102a, 102b and 102c, respectively. In order to enhance system performance, each of the specific geographical areas can be further divided into a plurality of smaller regions 104a, 104b and 104c for example. Each of the smaller areas can be named a cell, a sector or a segment. In IEEE 802.16e system, a cell identity (cell_ID or IDCell) is given with reference to a whole system. On the contrary, a sector or segment identity is given with reference to a specific area in which each base station provides a service and has a value set to one of 0 to 2. The mobile station 120 is distributed in the wireless communication system in general and is fixed or movable. Each of the mobile stations is able to communicate with at least one base station at a random moment in uplink ((UL) or downlink (DL). A base station and a mobile station are able to communicate with each other using one of CDMA (code division multiple access) system, FDMA (frequency division multiple access) system, TDMA (time division multiple access) system, SC-FDMA (single carrier frequency division multiple access) system, MC-FDMA (multi carrier frequency division multiple access) system, OFDMA (orthogonal frequency division multiple access) system, a combination thereof and the like. In this disclosure, 'uplink' indicates a communication link from a mobile station to a base station. And, 'downlink' indicates a communication link from a base station to a mobile station.

DISCLOSURE OF THE INVENTION

Technical Problem

Accordingly, the present invention is directed to a method for mapping subband/miniband in a wireless communication system and apparatus therefor that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, a method for mapping system bandwidth to subbands and minibands in a base station of a wireless communication system, according to the present invention includes the steps of dividing the system frequency band into a plurality of physical resource units (PRUs), and mapping the plurality of the physical resource units to at least one subband physical resource unit ($PRU_{SB}$) and at least one miniband physical resource unit ($PRU_{MB}$), wherein the mapping is based on an interval between contiguous resource units which includes a predetermined number of contiguous PRUs and another interval greater than the former interval and wherein the interval between the contiguous resource units is a roundup value of a value resulting from dividing a maximum number of the contiguous resource units by the number of the contiguous resource units to allocate to the minibands.

Preferably, the mapping is further based on a greatest common divisor between the maximum number of the contiguous resource units and the interval between the contiguous resource units.

Preferably, the predetermined number is a number ($N_1$) of the PRU constructing one subband.

More preferably, the mapping to the subband physical resource unit ($PRU_{SB}$) is performed by Formula 1:

$$PRU_{SB}[j]=PRU[i]; j=0, 1, \ldots, L_{SB}-1 \quad \text{[Formula 1]}$$

where $$i = N_1 \cdot \left\{ \left\lceil \frac{N_{sub}}{N_{sub} - K_{SB}} \right\rceil \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right\} \mod\{N_{sub}\} + \{j + L_{MB}\}\mod\{N_1\},$$

the $N_1$ is the number of the PRU constructing one subband, the $N_{sub}$ is the maximum number of subbands, the $K_{SB}$ is the number of allocating subbands, the GCD(x, y) is a greatest common divisor of x and y, and the $L_{MB}$ is the number of the PDU included in allocating minibands.

More preferably, the mapping to the miniband physical resource unit ($PRU_{MB}$) is performed by Formula 2:

$$PRU_{MB}[k]=PRU[i]; k=0, 1, \ldots, L_{MB}-1 \quad \text{[Formula 2]}$$

where $$i = N_1 \cdot \left\{ \left[ \frac{N_{sub}}{N_{sub} - K_{SB}} \right] \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right\}$$
$$\mod\{N_{sub}\} + \{k\} \mod\{N_1\},$$

the $N_1$ is the number of the PRU constructing one subband, the $N_{sub}$ is the maximum number of subbands, the $K_{SB}$ is the number of allocating subbands, and the GCD(x, y) is a greatest common divisor of x and y.

In this case, the term $$\left\lceil \frac{N_{sub}}{N_{sub} - K_{SB}} \right\rceil$$

is the interval between the contiguous resource units.

Preferably, the number of the PRU constructing one subband is different from the number of the PRU constructing one miniband.

To further achieve these and other advantages and in accordance with the purpose of the present invention, a base station in a wireless communication system includes a processor configured to divide system frequency band into a plurality of physical resource units (PRUs) and to map the plurality of the physical resource units to at least one subband physical resource unit ($PRU_{SB}$) and at least one miniband physical resource unit ($PRU_{MB}$), and a transmitting module configured to transmit a downlink signal to a terminal using the at least one subband physical resource unit ($PRU_{SB}$) and the at least one miniband physical resource unit ($PRU_{MB}$), wherein the mapping is based on an interval between contiguous resource units which includes a predetermined number of contiguous PRUs and another interval greater than the former interval and wherein the interval between the contiguous resource units is a roundup value of a value resulting from dividing a maximum number of the contiguous resource units by the number of the contiguous resource units to allocate to the minibands.

Preferably, the mapping is further based on a greatest common divisor between the maximum number of the contiguous resource units and the interval between the contiguous resource units.

Preferably, the predetermined number is a number ($N_1$) of the PRU constructing one subband.

More preferably, the mapping to the subband physical resource unit ($PRU_{SB}$) is performed by Formula 1:

$PRU_{SB}[j] = PRU[i]; j=0, 1, \ldots, L_{SB}-1$    [Formula 1]

where $$i = N_1 \cdot \left\{ \left[ \frac{N_{sub}}{N_{sub} - K_{SB}} \right] \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right\}$$
$$\mod\{N_{sub}\} + \{j + L_{MB}\} \mod\{N_1\},$$

the $N_1$ is the number of the PRU constructing one subband, the $N_{sub}$ is the maximum number of subbands, the $K_{SB}$ is the number of allocating subbands, the GCD(x, y) is a greatest common divisor of x and y, and the $L_{MB}$ is the number of the PDU included in allocating minibands.

More preferably, the mapping to the miniband physical resource unit ($PRU_{MB}$) is performed by Formula 2:

$PRU_{MB}[k] = PRU[i]; k=0, 1, \ldots, L_{MB}-1$    [Formula 2]

where $$i = N_1 \cdot \left\{ \left[ \frac{N_{sub}}{N_{sub} - K_{SB}} \right] \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right\}$$
$$\mod\{N_{sub}\} + \{k\} \mod\{N_1\},$$

the $N_1$ is the number of the PRU constructing one subband, the $N_{sub}$ is the maximum number of subbands, the $K_{SB}$ is the number of allocating subbands, and the GCD(x, y) is a greatest common divisor of x and y.

In this case, the term $$\left\lceil \frac{N_{sub}}{N_{sub} - K_{SB}} \right\rceil$$

is the interval between the contiguous resource units.

It is to be understood that both the foregoing general description and the following detailed description are exemplary and explanatory and are intended to provide further explanation of the invention as claimed.

Advantageous Effects

The present invention is able to efficiently secure diversity gain of miniband after completion of subband/miniband mapping in IEEE 802.16m system.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR INVENTION

Reference will now be made in detail to the preferred embodiments of the present invention, examples of which are illustrated in the accompanying drawings. First of all, embodiments of the present invention in the following description are examples for applying the technical features of the present invention are applied to a system that uses a plurality of orthogonal subcarriers. For clarity and convenience of the following description, the present invention is described using IEEE 802.16 system for example. And, the present invention is applicable to various wireless communication system including 3GPP (3rd Generation Partnership Project) system.

Figure 1:
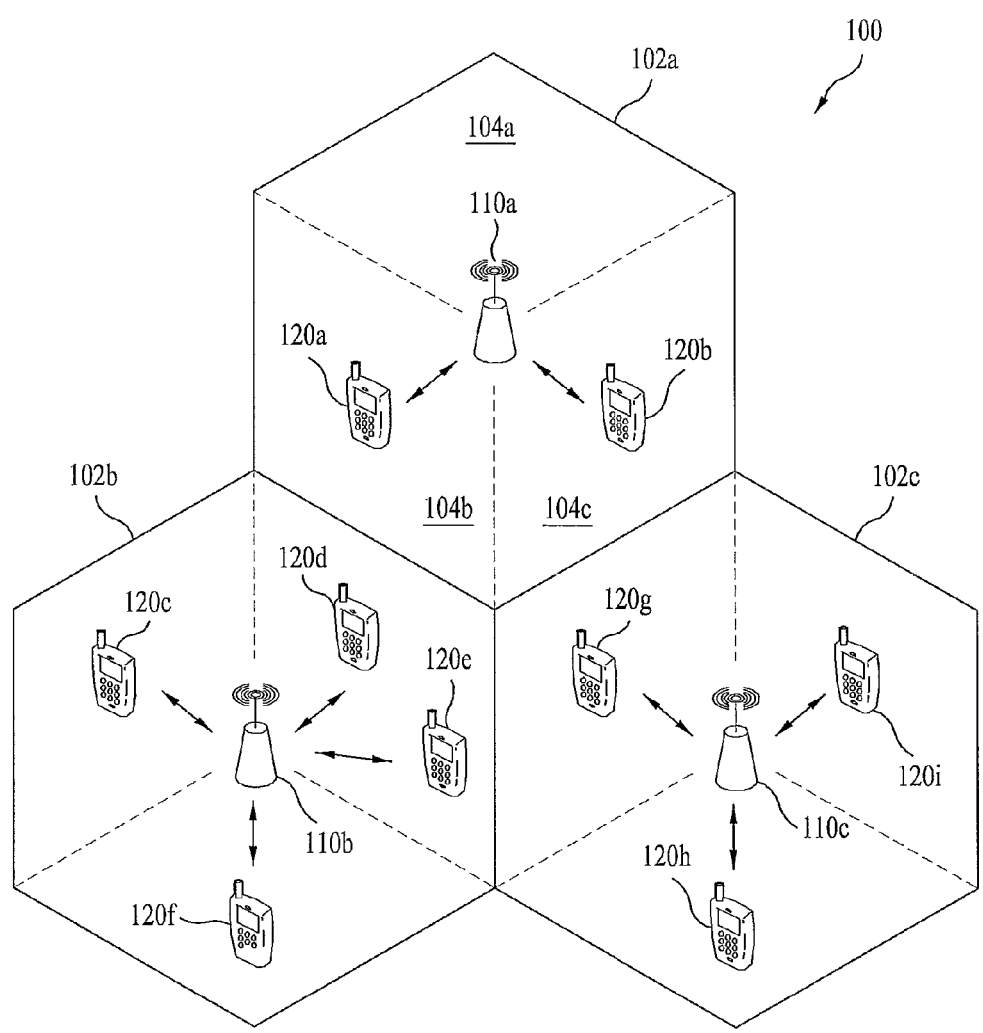
FIG. 1 is a diagram for an example of a wireless communication system.
Figure 2:
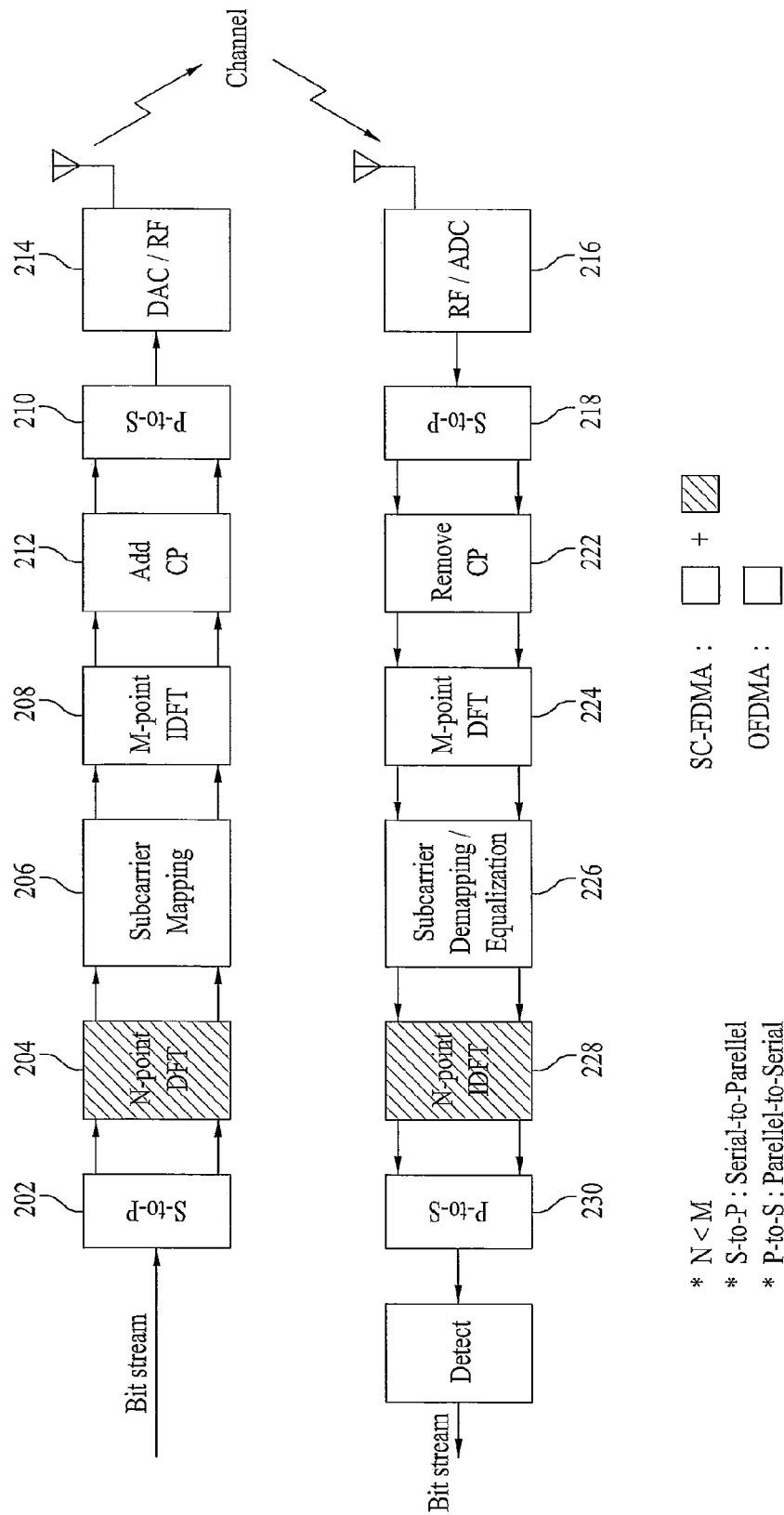
FIG. 2 is a block diagram for an example of a transmitter and receiver for OFDMA and SC-FDMA.

FIG. 2 is a block diagram for an example of a transmitter and receiver for OFDMA and SC-FDMA. In uplink, a transmitter may include a part of a mobile station and a receiver may include a part of a base station. In downlink, a transmitter may include a part of a base station and a receiver may include a part of a mobile station. Referring to FIG. 2, an OFDMA transmitter includes a Serial to Parallel converter 202, a subcarrier mapping module 206, an M-point IDFT (Inverse Discrete Fourier Transform) module 208, a cyclic prefix (CP) adding module 210, a Parallel to Serial converter 212 and an RF/DAC (Radio Frequency/Digital to Analog) converter module 214.

A signal processing process in an OFDMA transmitter is described as follows. First of all, a bitstream is modulated into a data symbol sequence. Particularly, it is able to obtain the bitstream by performing various signal processings including channel encoding, interleaving, scrambling and the like on a data block delivered from a MAC (medium access control) layer. A bitstream is often called a codeword and is equivalent to a data block received from a MAC layer. And, the data block received from the MAC layer can be called a transport block as well. Modulation scheme is non-limited by the above description and can include one of BPSK (Binary Phase Shift Keying), QPSK (Quadrature Phase Shift Keying), n-QAM (n-Quadrature Amplitude Modulation) and the like. Subsequently, a serial data symbol sequence is converted to N data symbols in parallel [202]. The N data symbols are mapped to N subcarriers allocated among total M subcarriers and the (M-N) remaining subcarriers are padded with 0 [206]. The data symbol mapped in a frequency domain is transformed into a time-domain sequence through M-point IDFT processing [208]. Afterwards, in order to reduce inter-symbol interference (ISI) and inter-carrier interference (ICI), OFDMA symbol is generated by adding a cyclic prefix to the time-domain sequence [210]. The generated OFDMA symbol is converted from parallel to serial [s21]. The OFDMA symbol is then transmitted to a receiver through digital-to-analog conversion, frequency uplink transform and the like [214]. And, available subcarriers among the (M-N) remaining subcarriers are allocated to another user. Meanwhile, an OFDMA receiver includes an RF/ADC (radio frequency/analog to digital converter) module 216, a serial to parallel converter 218, a CP removing (CP remove) module 220, an M-point DFT (discrete Fourier transform) module 224, a subcarrier demapping/equalization module 226, a parallel to serial converter 228 and a detection module 230. A signal processing process of the OFDMA receiver has a configuration in reverse to that of the OFDMA transmitter.

Meanwhile, compared to the OFDMA transmitter, an SC-FDMA transmitter further includes an N-point DFT module 204 behind the subcarrier mapping module 206. The SC-FDMA transmitter spreads a plurality of data in a frequency domain through DFT prior to IDFT processing, thereby considerably decreasing a PAPR (peak-to-average power ratio) into a level lower than that of OFDMA system. Compared to the OFDMA receiver, an SC-FDMA receiver further includes an N-point IDFT module 228 next to the subcarrier demapping module 226. And, a signal processing process of the SC-FDMA receiver has a configuration in reverse to that of the SC-FDMA transmitter.

The modules exemplarily shown in FIG. 2 are provided for the above description only. The transmitter and/or the receiver can further include at least one necessary module. The modules/functionality can be omitted in part or may be separable into different modules/functionality. At least two of the modules can be integrated into one module.

Figure 3:
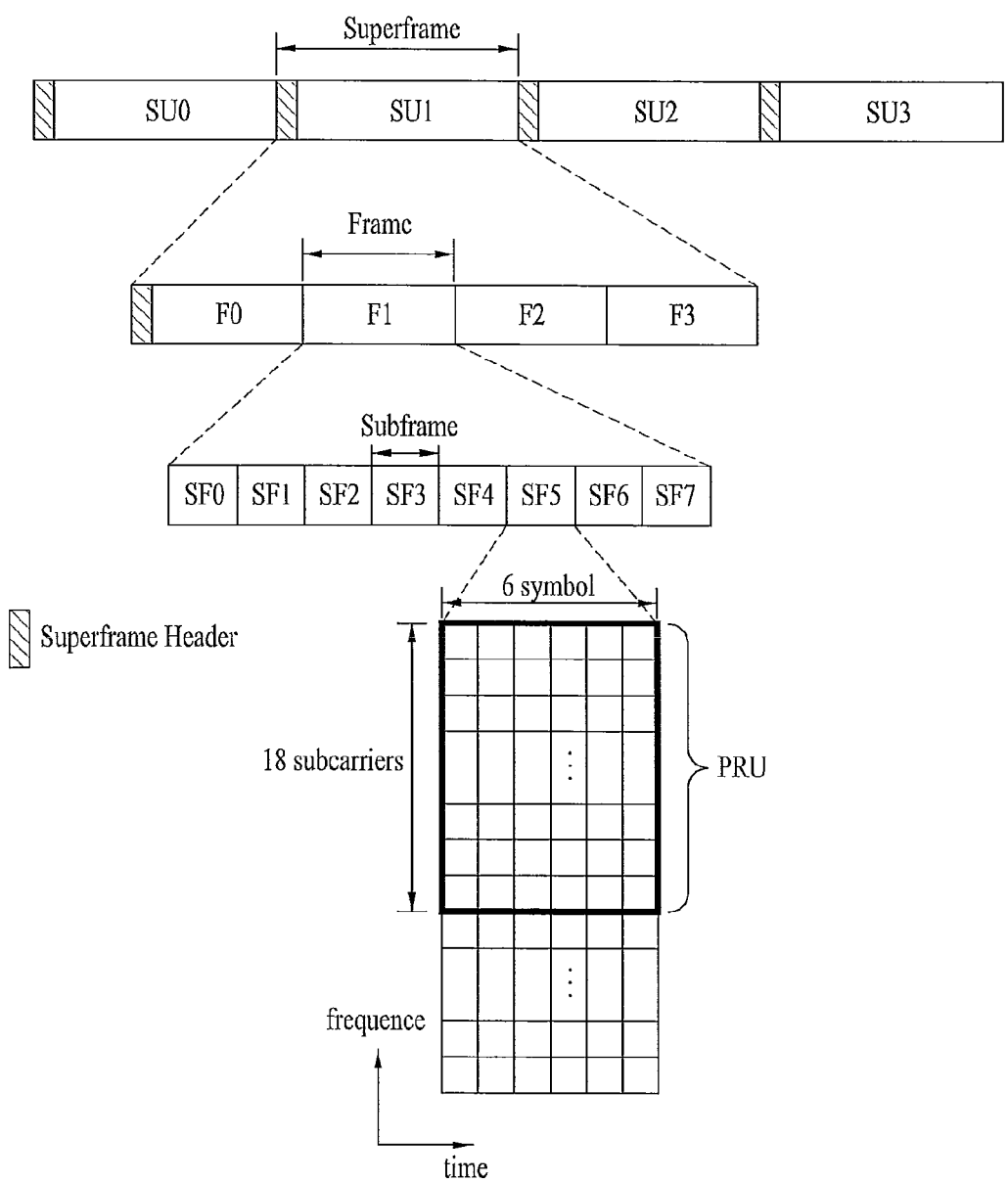
FIG. 3 is a diagram for a structure of a radio frame according to a duplex mode in IEEE 802.16m system.

FIG. 3 is a diagram for an example of a radio frame structure in IEEE 802.16m system.

Referring to FIG. 3, a radio frame structure includes 20 ms-superframs SU0 to SU3 capable of supporting 5 MHz, 8.75 MHz, 10 MHz or 20 MHz. The superframe includes 4 5 ms-frames F0 to F3 equal to each other in size and starts with a superframe header (SFH). The superframe header carries an essential system parameter and system configuration information.

A frame includes 8 subframes SF0 to SF7. The subframe is allocated to downlink or uplink transmission. The subframe includes a plurality of OFDM symbols in time domain or includes a plurality of subcarriers in frequency domain. The OFDM symbol can be called OFDMA symbol, SC-FDMA symbol or the like according to a multiple access system. The number of OFDM symbols included in a subframe can be variously modified according to a channel bandwidth, a CP length and the like.

It is able to define a type of a subframe according to the number of OFDM symbols included in a subframe. For instance, a type-1 subframe can be defined as including 6 OFDM symbols. A type-2 subframe can be defined as including 7 OFDM symbols. A type-3 subframe can be defined as including 5 OFDM symbols. And, a type-4 subframe can be defined as including 9 OFDM symbols. On frame includes subframes of the same type all or subframes differing from each other in type.

OFDM symbol includes a plurality of subcarriers. And, the number of the subcarriers is determined according to a size of FFT (fast Fourier transform). Types of subcarriers can be classified into a data subcarrier for data transmission, a pilot subcarrier for channel measurement, and a null subcarrier for a guard band and a DC component. Parameters for characterizing an OFDM symbol include BW, $N_{used}$, n, G, etc. The BW is a nominal channel bandwidth. The $N_{used}$ is the number of subcarriers used for signal transmission. The n is a sampling factor and determines subcarrier spacing and a useful symbol time together with BW and $N_{used}$. And, the G indicates a ratio of a CP type to a useful time.

Table 1 shows examples of OFDMA parameters.

TABLE 1

| The nominal channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, $T_b$ (μs) | | | 91.4 | 128 | 102.4 | 91.4 | 91.4 |
| CP ratio, G = 1/8 | OFDMA symbol time, $T_s$ (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| CP ratio, G = 1/16 | OFDMA symbol time, $T_s$ (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| CP ratio, G = 1/4 | OFDMA symbol time, $T_s$ (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard Sub-Carriers | Left | | 40 | 80 | 80 | 80 | 160 |
| | Right | | 39 | 79 | 79 | 79 | 159 |
| Number of Used Sub-Carriers | | | 433 | 865 | 865 | 865 | 1729 |
| Number of Physical Resource Unit (18 × 6) in a type-1 subframe. | | | 24 | 48 | 48 | 48 | 96 |

A subframe includes a plurality of physical resource units (PRUs) in frequency domain. The PRU is a basic unit for resource allocation and includes a plurality of OFDM symbol consecutive in time domain or a plurality of subcarriers continuous n frequency domain. For instance, the number of OFDM symbols within PRU can be equal to that of OFDM symbols included in a subframe. Hence, the number of OFDM symbols within PRU can be determined according to a type of a subframe. Meanwhile, the number of subcarriers within PRU can be set to 18. In this case, the PRU can be constructed with 6 OFDM symbols×18 subcarriers. The PRU can be called a distributed resource unit (DRU) or a continuous resource unit (CRU) according to resource allocation scheme.

The above-mentioned structure is exemplarily shown only. Therefore, it is able to variously modify a superframe length, the number of frames included in a superframe, the number of subframes included in a frame, the number of OFDMA symbols included in a subframe, a parameter of OFDMA symbol and the like. For instance, the number of subframes included in a frame can be variously modified according to a channel bandwidth or a length of CP (cyclic prefix).

Figure 4:
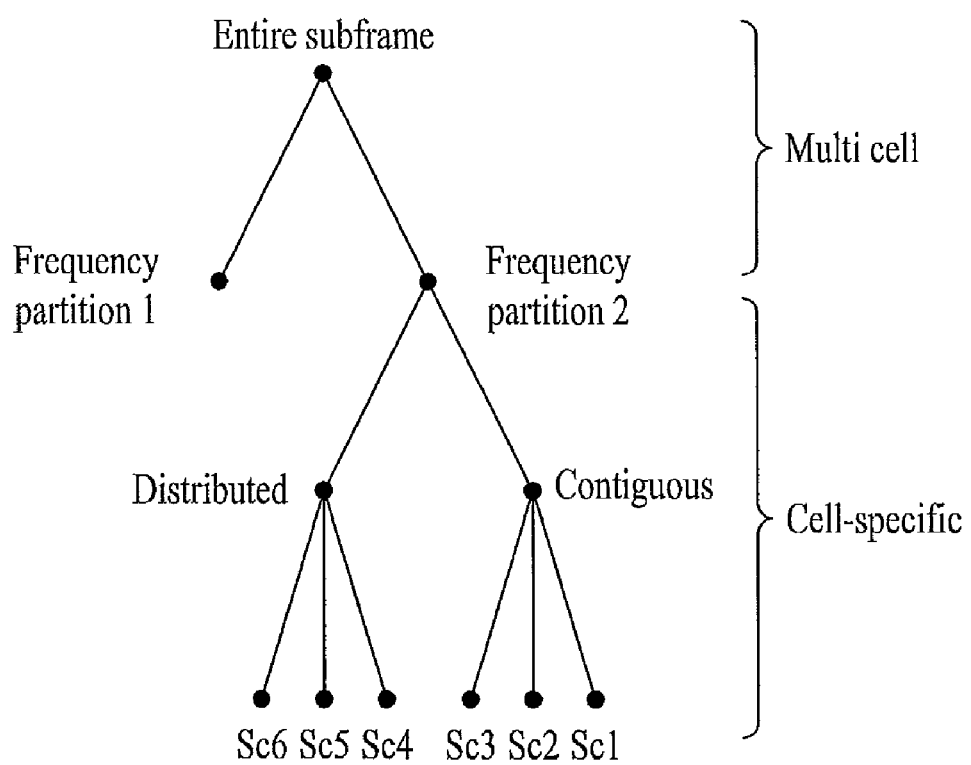
FIG. 4 is a diagram for an example of a physical structure of a subframe in IEEE 802.16m system.

FIG. 4 is a diagram for an example of a physical structure of a subframe in IEEE 802.16m system.

Referring to FIG. 4, a subframe can be partitioned into at least one frequency partition (FP). FIG. 4 shows an example that a subframe is partitioned into 2 frequency partitions, by which the number of frequency partitions is non-limited.

Each frequency partition includes at least one PRU. Distributed resource allocation scheme and/or contiguous resource allocation scheme is applicable to each frequency partition.

A logical resource unit (LRU) is a basic logical unit for the distributed resource allocation and the contiguous resource allocation. A logical distributed resource unit (LDRU) includes a plurality of subcarriers Sc distributed within a frequency band. A size of the LDRU is equal to that of the PRU. The LDRU is generally called a distributed LRU (DLRU). The LCRU (logical contiguous resource unit) includes contiguous subcarriers. A size of the LCRU is equal to that of the PRU. And, the LCRU is generally called a contiguous LRU (CLRU).

Figure 5:
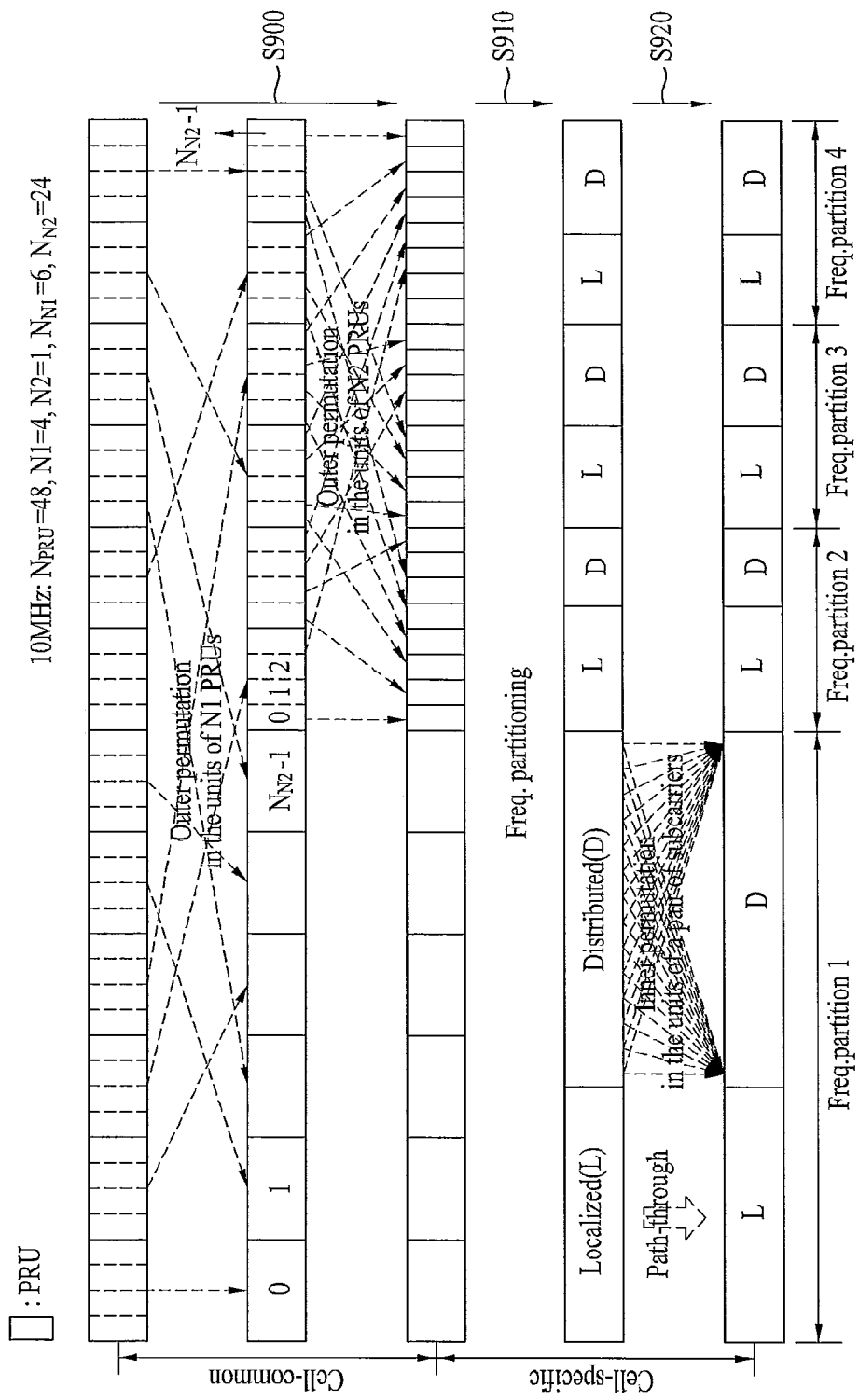
FIG. 5 is a diagram for an example of a process for mapping a resource unit in IEEE 802.16m system.

FIG. 5 is a diagram of an example for a process for mapping a resource unit in IEEE 802.16m system. In FIG. 5, for clarity, the following assumptions are taken for example. First of all, an entire frequency band is 10 MHz. The total number of PRUs is 48. $N_1$ is se to 4. The number ($N_{N1}$) of subbands having granularity of $N_1$ is 6. $N_2$ is se to 1. And, the number ($N_{N2}$) of minibands having granularity of $N_2$ is 24.

Referring to FIG. 5, PRU in a physical region is divided into subband PRU of logical region or miniband PRUs through outer permutation of granularity of $N_1$. And, permutation is then performed on the miniband PRU with granularity of $N_2$ [S500]. In particular, the outer permutation of the step S500 can be regarded as divided into a subband partitioning step of dividing PRUs in physical region into subband PRU and miniband PRU in logical region and a miniband permutation step of obtaining diversity gain of the PRU.

The subband or miniband PRU is distributed to each frequency partition. And, a step of discriminating contiguous resource L and distributed resource D within the frequency partition is performed [S510]. The process for distributing the subband or miniband PRU to each frequency partition is performed by being included in or separated from the outer permutation process of the step S500. In case that this process is performed independently, it is performed based on frequency partition information broadcasted through a super frame header (SFH) or based on a separate distribution rule.

In order to obtain a diversity gain for the distributed resource, inner permutation is additionally performed [S520]. In doing so, the inner permutation is executed by a unit of subcarrier pair and is called subcarrier permutation.

In the following description, a method of performing subband partitioning is explained.

First of all, since subband should be suitable for frequency selectivity allocation, contiguous PRU allocation scheme in frequency domain is applied. Since miniband should be suitable for obtaining frequency diversity gain, it is set to coexist in frequency domain.

Assume that the number of subbands used for one cell is set to $K_{SB}$. Assume that the number of PRUs allocated to subbands is set to $L_{SB}$. If so, the $L_{SB}$ has a value of $N_1 * K_{SB}$. In this case, the $K_{SB}$ can be signaled via DSAC (downlink subband allocation count) field corresponding to 3- to 5-bit information based on system bandwidth. And, DSAC can be transmitted to a mobile station via a superframe header.

The rest of total physical resources except subband are allocated to miniband. Assume that the number of minibands used for one cell is set to $K_{MB}$. Assume that the number of PRUs allocated to minibands is set to $L_{MB}$. If so, the $L_{MB}$ has a value of $N_2 * K_{MB}$. Hence, the number $N_{PRU}$ of the total PRUs is $L_{SB} L_{MB}$ and the number $N_{sub}$ of subbands for allocation is $\lfloor N_{PRU}/N_1 \rfloor$.

Table 2 shows mapping relation between DSAC and $K_{SB}$ if a system bandwidth is 20 or 10 MHz.

TABLE 2

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | N.A. |
| 23 | N.A. |
| 24 | N.A. |
| 25 | N.A. |
| 26 | N.A. |
| 27 | N.A. |
| 28 | N.A. |
| 29 | N.A. |
| 30 | N.A. |
| 31 | N.A. |

Table 3 shows mapping relation between DSAC and $K_{SB}$ if a system bandwidth is 10 MHz. And, Table 4 shows mapping relation between DSAC and $K_{SB}$ if a system bandwidth is 5 MHz.

TABLE 3

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | N.A. |
| 11 | N.A. |
| 12 | N.A. |
| 13 | N.A. |
| 14 | N.A. |
| 15 | N.A. |

TABLE 4

| DSAC | # of subbands allocated ($K_{SB}$) |
|---|---|
| 0 | 0 |
| 1 | 1 |
| 2 | 2 |
| 3 | 3 |
| 4 | N.A. |
| 5 | N.A. |
| 6 | N.A. |
| 7 | N.A. |

As mentioned in the foregoing description, the physical resources PRUs are divided into subband PRUs and miniband PRUs, which are represented as $PRU_{SB}$ and $PRU_{MB}$, respectively. $PRU_{SB}$ set is indexed from 0 to $L_{SB-1}$. Likewise, $PRU_{MB}$ set is indexed from 0 to $L_{MB-1}$.

Generally, in order to map PRU to $PRU_{SB}$, Formula 1 is used. In order to map PRU to $PRU_{MB}$, Formula 2 is used.

$$PRU_{SB}[j] = PRU[i], j=0, 1, \ldots, L_{SB}-1 \quad \text{[Formula 1]}$$

Yet, $$i = N_1 \cdot \left\{ \left\lfloor \frac{N_{sub}}{K_{SB}} \right\rfloor \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/K_{SB} \rceil)}{N_{sub}} \right\rfloor \right\} \bmod\{N_{sub}\} + \{j\}\bmod\{N_1\}.$$

$$PRU_{MB}[k] = PRU[i], k=0, 1, \ldots, L_{MB}-1 \quad \text{[Formula 2]}$$

Yet, $$i = \begin{cases} N_1 \cdot \left\{ \left\lceil \frac{N_{sub}}{K_{SB}} \right\rceil \cdot \left\lfloor \frac{k+L_{SB}}{N_1} \right\rfloor + \left\lfloor \frac{k+L_{SB}}{N_1} \right\rfloor \cdot \frac{GCD(N_{sub}, \lceil N_{sub}/K_{SB} \rceil)}{N_{sub}} \right\} & K_{SB} > 0 \\ \mod\{N_{sub}\} + \{k + L_{SB}\}\mod\{N_1\} & \\ k & K_{SB} = 0. \end{cases}$$

In Formula 1 and Formula 2, GCD (x, y) indicates a greatest common divisor. $\lceil x \rceil$ indicates a roundup value of x. $\lfloor y \rfloor$ indicates a round-down value of y. And, x mod y indicates a modulo operation of x and y.

Referring to Formula 1 and Formula 2, it can be observed that a term $$\left\lceil \frac{N_{sub}}{K_{SB}} \right\rceil$$

for determining an inter-subband interval is included. Looking into $$\left\lceil \frac{N_{sub}}{K_{SB}} \right\rceil,$$

the following facts can be observed. First of all, total PRUs are divided by $N_1$ unit that is a size of subband. Secondly, an interval of subbands, which are allocated using the maximum number of available subbands and the number of subbands to allocate, on physical frequency band is determined.

Figure 6:
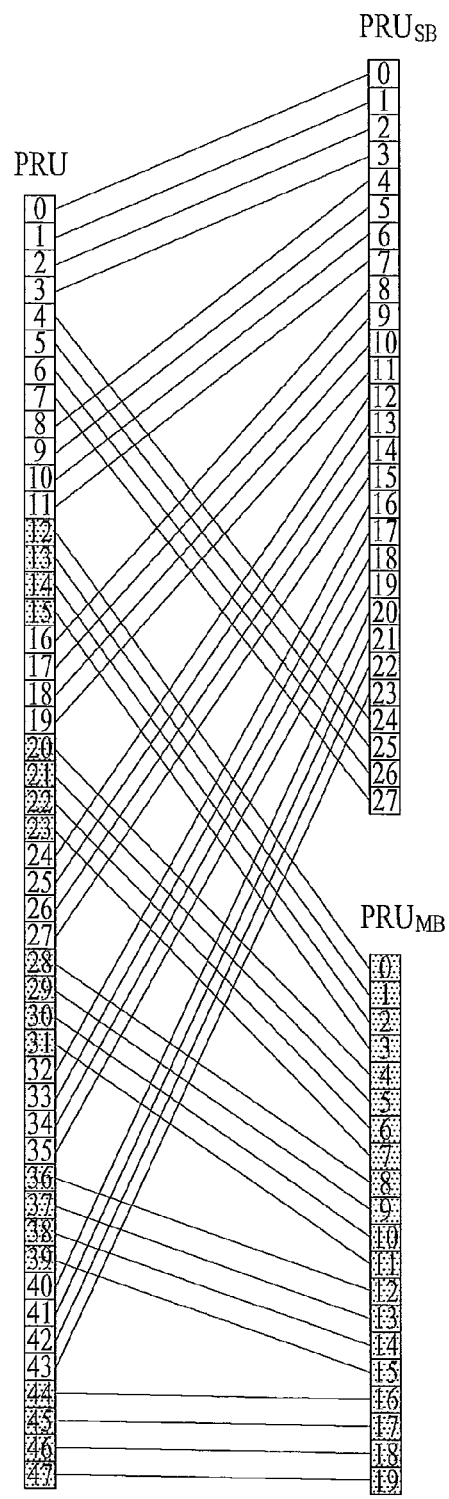
FIG. 6 is a diagram of an example for a general subband partitioning scheme in IEEE 802.16m system.

FIG. 6 is a diagram of an example for a general subband partitioning scheme in IEEE 802.16m system, in which 48 PRUs are divided into $PRU_{SB}$ and $PRU_{MB}$. In particular, FIG. 6 shows a case that system bandwidth, $N_{PRU}$, $N_1$, $N_2$ and $K_{SB}$ are set to 10 MHz, 48, 4, 1 and 7, respectively.

Referring to FIG. 6, $PRU_{SB}$'s consist of 7 subbands and total 28 PRUs according to Formula 1. And, $PRU_{MB}$'s consist of 20 minibands according to Formula 2. In particular, if total 48 PRUs are divided by $N_1$ PRUs amounting to the subband unit, total 12 subbands are possible. In this case, since the number $K_{SB}$ of subbands to allocate is 7, total PRUs are allocated to subbands and minibands by two allocation unit intervals on the assumption that $N_1$ PRUs are the basic allocation unit according to the $$\left\lceil \frac{N_{sub}}{K_{SB}} \right\rceil.$$

In particular, regarding the subbands according to Formula 1, PRU indexes 0 to 3 are mapped to $PRU_{SB}$ and PRU indexes 8 to 11 are mapped to $PRU_{SB}$. Subsequently, PRU indexes 16 to 19 are mapped to $PRU_{SB}$ and PRU indexes 24 to 27 are mapped to $PRU_{SB}$. Thus, by assuming $N_1$ PRUs as a basic allocation unit, PRUs are allocated to subbands by two allocation unit intervals.

Likewise, regarding minibands according to Formula 2, PRU indexes 12 to 15 are mapped to $PRU_{MB}$ and PRU indexes 20 to 23 are mapped to $PRU_{MB}$ by the two allocation unit intervals.

Having been portioned into the subbands and the minibands, in order to obtain diversity gain, miniband permutation is performed on $PRU_{MB}$'s. The permutated $PRU_{MB}$'s are represented as $PPRU_{MB}$. Since the $PRU_{MB}$ is allocated to the $N_1$ contiguous PRU unit which is the basic allocation unit in the subband partitioning process, the miniband permutation is essential to obtain the diversity gain. The relation between $PRU_{MB}$ and $PPRU_{MB}$ is represented as Formula 3.

$$PPRU_{MB}[j] = PRU_{MB}[I], j = 0, 1, \ldots, L_{MB} - 1 \quad \text{[Formula 3]}$$

Yet, $$i = (q(j) \mod(D)) \cdot P + \left\lfloor \frac{q(i)}{D} \right\rfloor$$

$$P = \min(K_{MB}, N_1/N_2)$$

$$r(j) = \max(j - (K_{MB} \mod(P) \cdot D), 0)$$

$$q(j) = j + \left\lfloor \frac{r(i)}{D-1} \right\rfloor$$

$$D + \left\lfloor \frac{K_{MB}}{P} + 1 \right\rfloor.$$

Figure 7:
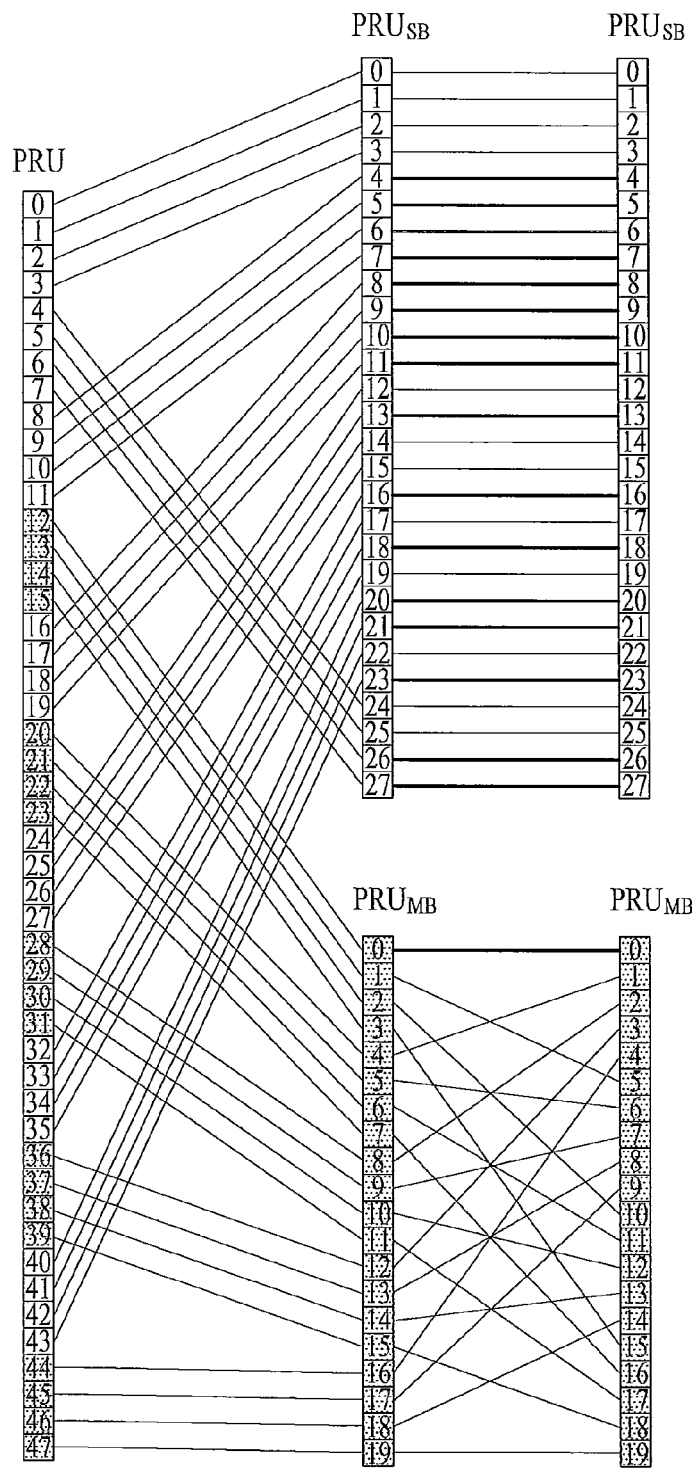
FIG. 7 is a diagram of an example for performing general miniband permutation in IEEE 802.16m system.

FIG. 7 is a diagram of an example for performing general miniband permutation in IEEE 802.16m system. Like FIG. 6, HG 7 also shows a case that system bandwidth, $N_{PRU}$, $N_1$, $N_2$ and $K_{SB}$ are set to 10 MHz, 48, 4, 1 and 7, respectively.

Referring to FIG. 7, the minibands partitioned by Formula 1 and Formula 2 are permutated by Formula 3 to obtain diversity gain.

Subbands and minibands are obtained by subband partitioning, the partitioned minibands are permutated, the $PRU_{SB}$'s and the $PRU_{MB}$'s are allocated to one frequency partition. Basically, one frequency partition exists and maxim 4 frequency partitions can be set. This frequency partition setting is included in DFPC (downlink frequency partition configuration) field that is 4- or 3-bit information based on FFT size. And, the DFPC is delivered via SFH to a mobile station as well.

In particular, FPCT (frequency partition count) indicates the number of frequency partitions, $FP_i$ (frequency partition index) indicates a frequency partition index, and FPS, (frequency partition size) indicates the number of PRUs included in an $i^{th}$ frequency partition. The FPCT, $FP_i$ and $FPS_i$ are determined from the DFPC field as shown in Tables 5 to 7. Moreover, DFPSC (downlink frequency partition subband count) field indicates the number of subbands included in $FP_i$ and includes 1- to 3-bit information.

TABLE 5

| DFPC | Freq. Partitioning ($FP_0:FP_1:FP_2:FP_3$) | FPCT | $FPS_0$ | $FPS_i$ (i > 0) |
|---|---|---|---|---|
| 0 | 1:0:0:0 | 1 | $N_{PRU}$ | 0 |
| 1 | 0:1:1:1 | 3 | 0 | $FPS_1 = N_{PRU} - 2 * floor(N_{PRU}/3)$<br>$FPS_2 = floor(N_{PRU}/3)$<br>$FPS_3 = floor(N_{PRU}/3)$ |
| 2 | 1:1:1:1 | 4 | $N_{PRU} - 3 * floor(N_{PRU}/4)$ | $floor(N_{PRU}/4)$ |
| 3 | 3:1:1:1 | 4 | $N_{PRU} - 3 * floor(N_{PRU}/6)$ | $floor(N_{PRU}/6)$ |
| 4 | 5:1:1:1 | 4 | $N_{PRU} - 3 * floor(N_{PRU}/8)$ | $floor(N_{PRU}/8)$ |
| 5 | 9:1:1:1 | 4 | $N_{PRU} - 3 * floor(N_{PRU}/12)$ | $floor(N_{PRU}/12)$ |
| 6 | 9:5:5:5 | 4 | $N_{PRU} - 3 * floor(N_{PRU} * 5/24)$ | $floor(N_{PRU} * 5/24)$ |
| 7 | 0:1:1:0 | 2 | 0 | $N_{PRU}/2$ for i = 1, 2<br>0 for i = 3 |
| 8 | 1:1:1:0 | 3 | $N_{PRU} - 2 * floor(N_{PRU}/3)$ | $floor(N_{PRU}/3)$ for i = 1, 2<br>0 for i = 3 |
| 9-15 | Reserved | | | |

TABLE 6

| DFPC | Freq. Partitioning ($FP_0:FP_1:FP_2:FP_3$) | FPCT | $FPS_0$ | $FPS_i$ (i > 0) |
|---|---|---|---|---|
| 0 | 1:0:0:0 | 1 | $N_{PRU}$ | 0 |
| 1 | 0:1:1:1 | 3 | 0 | $FPS_1 = N_{PRU} - 2 * floor(N_{PRU}/3)$<br>$FPS_2 = floor(N_{PRU}/3)$<br>$FPS_3 = floor(N_{PRU}/3)$ |
| 2 | 1:1:1:1 | 4 | $N_{PRU} - 3 * floor(N_{PRU}/4)$ | $floor(N_{PRU}/4)$ |
| 3 | 3:1:1:1 | 4 | $N_{PRU} - 3 * floor(N_{PRU}/6)$ | $floor(N_{PRU}/6)$ |
| 4 | 5:1:1:1 | 4 | $N_{PRU} - 3 * floor(N_{PRU}/8)$ | $floor(N_{PRU}/8)$ |
| 5 | 9:5:5:5 | 4 | $N_{PRU} - 3 * floor(N_{PRU} * 5/24)$ | $floor(N_{PRU} * 5/24)$ |
| 6 | 0:1:1:0 | 2 | 0 | $N_{PRU}/2$ for i = 1, 2<br>0 for i = 3 |
| 7 | 1:1:1:0 | 3 | $N_{PRU} - 2 * floor(N_{PRU}/3)$ | $floor(N_{PRU}/3)$ for i = 1, 2<br>0 for i = 3 |

TABLE 7

| DFPC | Freq. Partitioning ($FP_0:FP_1:FP_2:FP_3$) | FPCT | $FPS_0$ | $FPS_i$ (i > 0) |
|---|---|---|---|---|
| 0 | 1:0:0:0 | 1 | $N_{PRU}$ | 0 |
| 1 | 0:1:1:1 | 3 | 0 | $N_{PRU}/3$ |
| 2 | 1:1:1:1 | 4 | $N_{PRU}/4$ | $N_{PRU}/4$ |
| 3 | 3:1:1:1 | 4 | $N_{PRU}/2$ | $N_{PRU}/6$ |
| 4 | 9:5:5:5 | 4 | $N_{PRU} * 3/8$ | $N_{PRU} * 5/24$ |
| 5 | 0:1:1:0 | 2 | 0 | $N_{PRU}/2$ for i = 1, 2<br>0 for i = 3 |
| 6 | 1:1:1:0 | 3 | $N_{PRU}/3$ | $N_{PRU}/3$ for i = 1, 2<br>0 for i = 3 |
| 7 | Reserved | | | |

Table 5 indicates mapping relations between DFPC and frequency partition related parameters if FFT size is 2,048. Table 6 indicates mapping relations between DFPC and frequency partition related parameters if FFT size is 1,024. Table 7 indicates mapping relations between DFPC and frequency partition related parameters if FFT size is 512.

The number of subbands included in $i^{th}$ frequency partition is determined by $K_{SB,FPi}$ and the number of minibands is determined by $K_{MB,FPi}$. The $K_{MB,FPi}$ is determined by DFPSC and $FPS_i$. The total number of subbands included in each frequency partition is determined by $L_{SB,FPi}$ and the $L_{SB,FPi}$ is determined by $N1*K_{SB,FPi}$. Likewise, the total number of minibands included in each frequency partition is determined by $L_{SB,FPi}$ and the $L_{MB,FPi}$ is determined by $N1*K_{MB,FPi}$.

In particular, the $K_{SB,FPi}$ is determined by Formula 4.

$$K_{SB,FP_i} = \begin{cases} K_{SB} - (FPCT - 1) \cdot DFPSC & i = 0, FPCT = 4 \\ DFPSC & i > 0, FPCT = 4 \\ DFPSC & i > 0, FPCT = 3, DFPC = 1 \\ K_{SB} - (FPCT - 1) \cdot DFPSC & i = 0, FPCT = 3, DFPC \neq 1 \\ DFPSC & i = 1, 2, FPCT = 3, DFPC \neq 1 \\ DFPSC & i = 1, 2, FPCT = 2 \\ K_{SB} & i = 0, FPCT = 1 \end{cases}$$ [Formula 4]

Moreover, the $K_{MB,FPi}$ is determined by Formula 5.

$$K_{MB,FPi} = (FPS_i - K_{SB,FPi} \cdot N_1)/N_2 \quad 0 \leq i < FPCT \quad \text{[Formula 5]}$$

Finally, mapping of $PRU_{SB}$ and $PRU_{MB}$ to $i^{th}$ frequency partition is determined by Formula 6.

$$PRU_{FP_i}(j) = \begin{cases} PRU_{SB}(k_1) & \text{for } 0 \le j < L_{SB.FP_i} \\ PPRU_{MB}(k_2) & \text{for } L_{SB.FP_i} \le j < (L_{SB.FP_i} + L_{MB.FP_i}) \end{cases}$$ [Formula 6]

Yet, $$k_1 = \sum_{m=0}^{i-1} L_{SB.FP_m} + j$$

and $$k_2 = \sum_{m=0}^{i-1} L_{MB.FP_m} + j - L_{SB.FP_i}.$$

Figure 8:
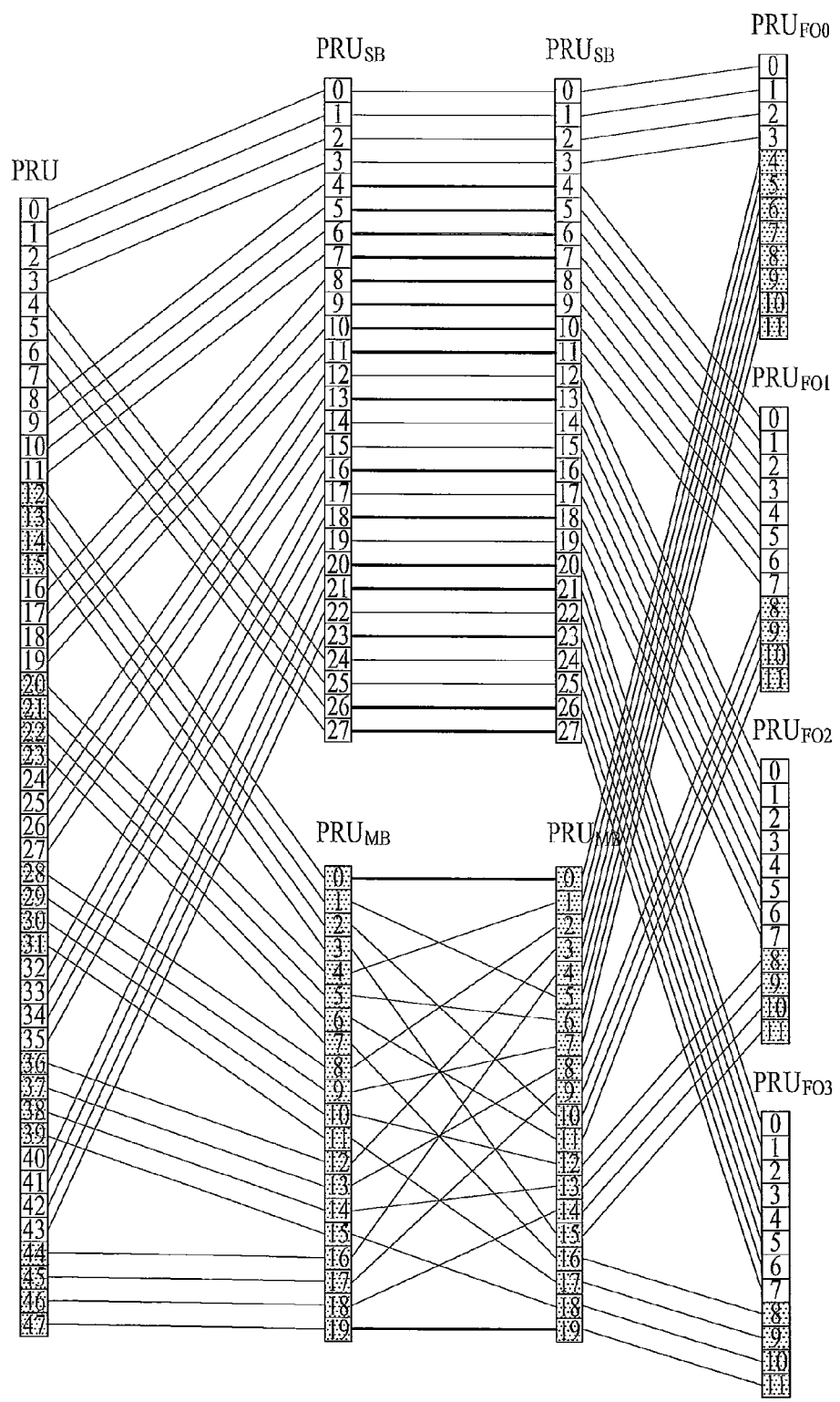
FIG. 8 is a diagram of a process for performing general frequency partitioning in IEEE 802.16m system.

FIG. 8 is a diagram of a process for performing general frequency partitioning in IEEE 802.16m system. FIG. 8 shows an exemplary case that system bandwidth, $K_{SB}$, FPCT, $FPS_i$ and DFPSC are 10 MHz, 7, 2, 12 and 2, respectively.

As mentioned in the foregoing description, looking into the subband partitioning process of Formula 1 and Formula 2, it can be observed that the term $$\left\lceil \frac{N_{sub}}{K_{SB}} \right\rceil$$

for determining inter-subband interval is included. If $K_{SB}$ is set to a greater value, an interval between frequency bands allocated to minibands in total PRUs is narrowed. Therefore, even if miniband permutation is performed, it is difficult to secure diversity of minibands.

Figure 9:
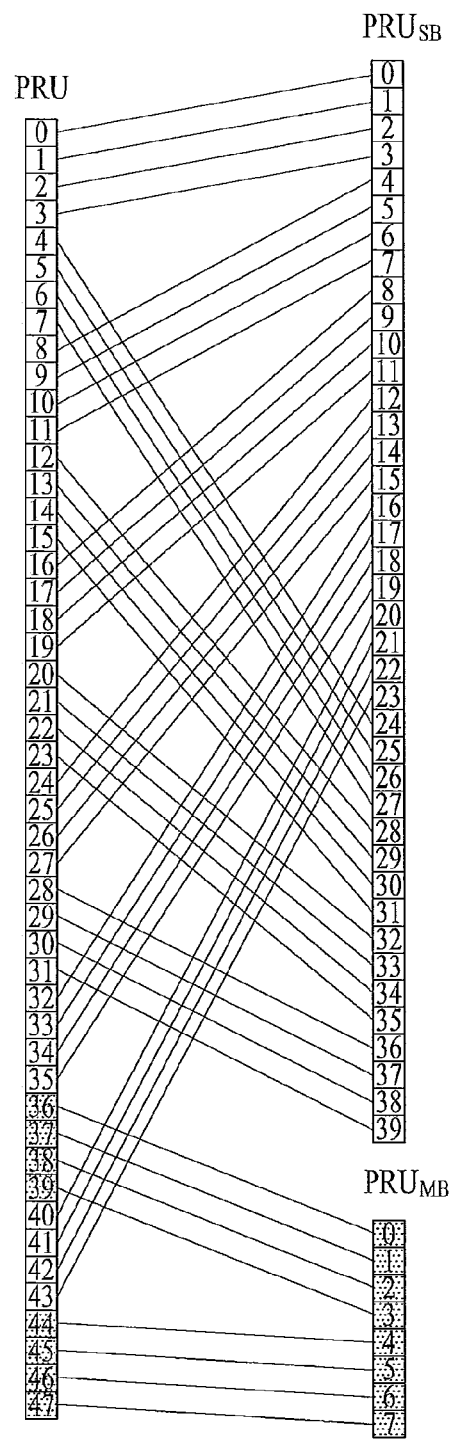
FIG. 9 is a diagram for explaining a program of a general subband partitioning scheme in IEEE 802.16m system.

FIG. 9 is a diagram for explaining a program of a general subband partitioning scheme in IEEE 802.16m system, in which 48 PRUs are divided into $PRU_{MB}$ and $PRU_{MB}$ according to Formula 1 and Formula 2. In particular, FIG. 9 shows a case that system bandwidth, $N_{PRU}$, $N_1$, $N_2$ and $K_{SB}$ are set to 10 MHz, 48, 4, 1 and 10, respectively.

Referring to FIG. 9, as mentioned in the foregoing description with reference FIG. 6, it can be observed that total PRUs are allocated to subbands and minibands with two allocation unit intervals by assuming $N_1$ PRUs as a basic allocation unit according to $$\left\lceil \frac{N_{sub}}{K_{SB}} \right\rceil.$$

In particular, regarding the minibands, PRU indexes 36 to 39 are mapped to $PRU_{MB}$ according to Formula 2 and PRU indexes 44 to 47 are mapped to $PRU_{MB}$ with the two allocation unit intervals. Thus, since an interval between frequency bands allocated to minibands in the total PRUs is narrowed, it is difficult to secure diversity of minibands despite executing miniband permutation.

To solve this problem, a first embodiment of the present invention proposes to amend Formula 1 and Formula 2 into Formula 7 and Formula 8.

$$PRU_{SB}[j] = PRU[i]; j = 0, 1, \ldots, L_{SB}-1 \quad \text{[Formula 7]}$$

Yet, $$i = N_1 \cdot \left\{ \left\lceil \frac{N_{sub}}{N_{sub} - K_{SB}} \right\rceil \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right\}$$
$$\mod\{N_{sub}\} + \{j + L_{MB}\} \mod\{N_1\}.$$

$$PRU_{MB}[k] = PRU[i]; k = 0, 1, \ldots, L_{MB}-1 \quad \text{[Formula 8]}$$

Yet, $$i = \begin{cases} N_1 \cdot \left\{ \left\lceil \frac{N_{sub}}{N_{sub} - K_{SB}} \right\rceil \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right\} \\ \mod\{N_{sub}\} + \{k\} \mod\{N_1\}; K_{SB} > 0 \\ k; \quad K_{SB} = 0. \end{cases}$$

Formula 7 and Formula 8 are obtained from modifying formulas in a manner that allocation of subbands and allocation of minibands are switched to each other in the allocations of Formula 1 and Formula 2. In particular, the term $$\left\lceil \frac{N_{sub}}{K_{SB}} \right\rceil$$

for determining the inter-subband interval in Formula 1 and Formula 2 is changed into $$\left\lceil \frac{N_{sub}}{N_{sub} - K_{SB}} \right\rceil.$$

Subsequently, regarding allocation order, allocation for subbands is performed behind allocation for minibands instead of allocating minibands prior to subbands. If the number of subbands to allocate is considerable, interval between frequency, bands allocated to miniband in total PRUs is increased. Therefore, diversity gain of minibands can be sufficiently obtained.

Figure 10:
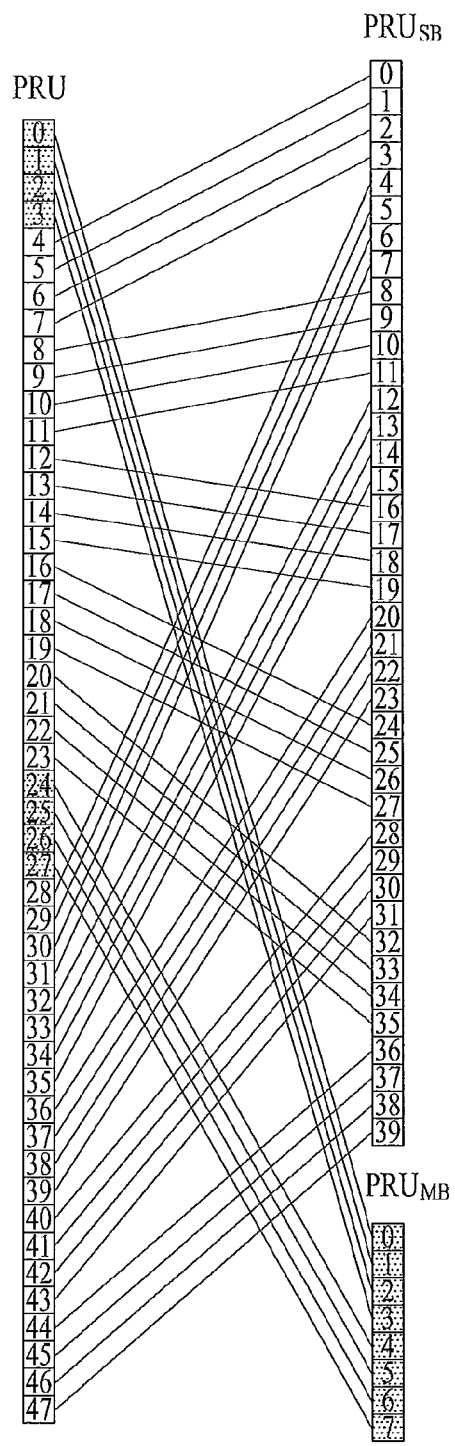
FIG. 10 is a diagram of one example for performing a subband partitioning scheme in IEEE 802.16m system according to an embodiment of the present invention.

FIG. 10 is a diagram of one example for performing a subband partitioning scheme in IEEE 802.16m system according to an embodiment of the present invention, in which 48 PRUs are divided into $PRU_{SB}$ and $PRU_{MB}$ according to Formula 7 and Formula 8. In particular, FIG. 10 shows a case that system bandwidth, $N_{PRU}$, $N_1$, $N_2$ and $K_{SB}$ are set to 10 MHz, 48, 4, 1 and 10, respectively.

Referring to FIG. 10, if total 48 PRUs are divided into $N_1$ PRUs of subband unit, total 12 subbands are possible. In this case, according to the term $$\left\lceil \frac{N_{sub}}{N_{sub} - K_{SB}} \right\rceil$$

in Formula 7 and Formula 8, it can be observed that by assuming $N_1$ PRUs as a basic allocation unit, the PRUs are allocated to subbands and minibands with 6 allocation unit intervals or more (7 allocation units in the present embodiment).

In particular, regarding subbands, PRU indexes 4 to 7 are mapped to $PRU_{SB}$ according to Formula 7 and PRU indexes 28 to 31 are mapped to $PRU_{SB}$ by leaving 6 allocation unit intervals. Subsequently, PRU indexes 8 to 11 are mapped to $PRU_{SB}$ by leaving 7 allocation unit intervals and PRU indexes 32 to 35 are then mapped to $PRU_{MB}$ by leaving 6 allocation unit intervals again. According to the present invention, it is advantageous in that resources more contiguous in frequency domain are allocated to subbands.

Moreover, regarding minibands, PRU indexes 0 to 3 are mapped to $PRU_{MB}$ according to Formula 8 and PRU indexes 24 to 27 are mapped to $PRU_{MB}$ by leaving 6 allocation unit intervals. Namely, since frequency resources allocated to minibands are distributed with a wide interval in physical region, it is able to obtain higher diversity gain in case of miniband permutation as well.

Figure 11:
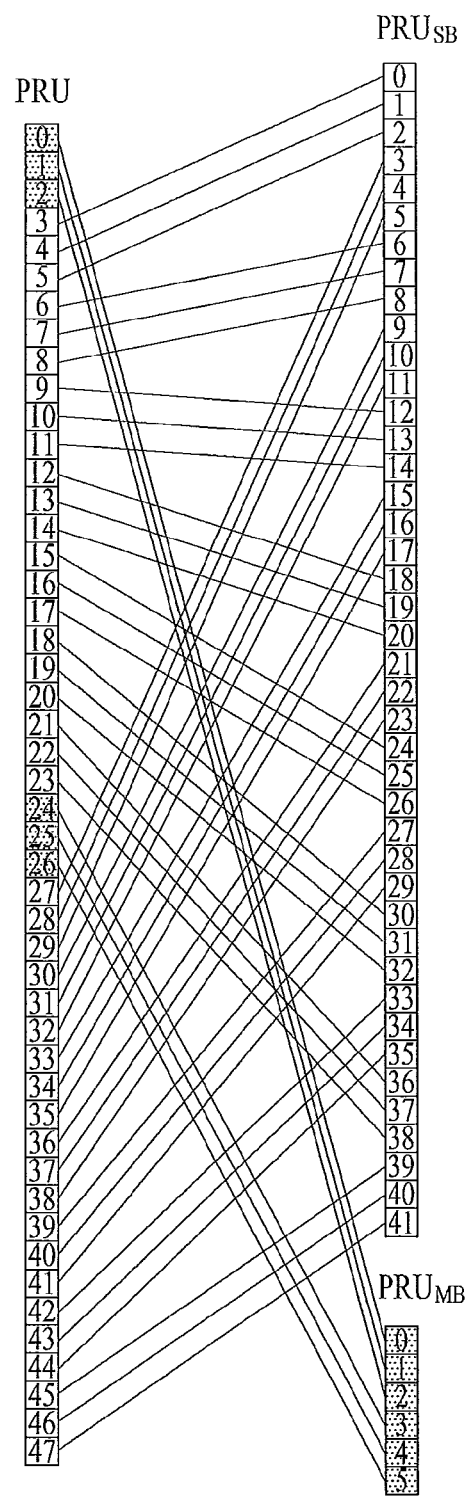
FIG. 11 is a diagram of another example for performing a subband partitioning scheme in IEEE 802.16m system according to an embodiment of the present invention.

FIG. 11 is a diagram of another example for performing a subband partitioning scheme in IEEE 802.16m system according to an embodiment of the present invention, in which 48 PRUs are divided into $PRU_{MB}$ and $PRU_{MB}$ according to a partitioning scheme of the present invention. In particular, FIG. 11 shows a case that system bandwidth, $N_{PRU}$, $N_1$, $N_2$ and $K_{SB}$ are set to 10 MHz, 48, 3, 1 and 14, respectively.

Referring to FIG. 11, if total 48 PRUs are divided into $N_1$ PRUs of subband unit, total 16 subbands are possible. In this case, according to the term $$\left\lceil \frac{N_{sub}}{N_{sub} - K_{SB}} \right\rceil$$

in Formula 7 and Formula 8, it can be observed that by assuming $N_1$ PRUs as a basic allocation unit, the PRUs are allocated to subbands and minibands with 8 allocation unit intervals. In particular, regarding minibands, PRU indexes 0 to 2 are mapped to $PRU_{MB}$ according to Formula 8 and PRU indexes 24 to 26 are mapped to $PRU_{MB}$ by leaving 8 allocation unit intervals. Namely, since frequency resources allocated to minibands are distributed with a wide interval in physical region, it is able to obtain higher diversity gain in case of miniband permutation as well.

Moreover, regarding subbands, PRU indexes 3 to 5 are mapped to $PRU_{SB}$ according to Formula 7 and PRU indexes 27 to 29 are mapped to $PRU_{SB}$ by leaving 8 allocation unit intervals. Subsequently, PRU indexes 6 to 8 are mapped to $PRU_{SB}$ by leaving 9 allocation unit intervals and PRU indexes 30 to 32 are then mapped to $PRU_{SB}$ by leaving 8 allocation unit intervals again.

In another method for solving the aforesaid problems, a formula for mapping subbands and minibands if $K_{SB}$ is equal to or smaller than a specific number. If the $K_{SB}$ is greater than the specific number, the $K_{SB}$ is replaced by $max(K_{SB})-K_{SB}$, i.e., $N_{sub}-K_{SB}$. And, the above-defined formulas for mapping the subbands and minibands are applied by being switched to each other. In particular, if the $K_{SB}$ (or SAC) is greater than $N_{sub}/2$, $PRU_{SB}$ replaces $K_{SB}$ by $N_{sub}-K_{SB}$ and the applies the allocation rule of $PRU_{MB}$. On the contrary, $PRU_{MB}$ replaces $K_{SB}$ by $N_{sub}-K_{SB}$ and then applies the allocation rule of $PRU_{SB}$.

This can be generalized into the form shown in Table 8.

TABLE 8

If $K_{SB} \leq N_{sub}/2$,
    $PRU_{SB}[j]=PRU[i]$ ; $j=0,1,\ldots,L_{SB}-1$,
        where $i=Function_{SB}(K_{SB})$;
    $PRU_{MB}[k]=PRU[i]$; $j=0,1,\ldots,L_{MB}-1$,
        where $i=Function_{MB}(K_{SB},L_{SB})$;
else
    $PRU_{SB}[j]=PRU[i]$ ; $j=0,1,\ldots,L_{SB}-1$,
        where $i=Function_{MB}(N_{sub}-K_{SB}, L_{MB})$;
    $PRU_{MB}[k]=PRU[i]$ ; $j=0,1,\ldots,L_{MB}-1$,
        where $i=Function_{SB}(N_{sub}-K_{SB})$;
end The above-described embodiment of the present invention is applied to Formula 1 and Formula 2 for performing the subband and miniband mapping to provide Formula 9 and Formula 10.

$$PRU_{SB}[j]=PRU[i], j=0, 1, \ldots, L_{SB}--1 \qquad \text{[Formula 9]}$$

yet, if $K_{SB} \leq N_{sub}/2$, $$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/K_{SB} \rceil)}{N_{sub}} \right\rfloor \right\} \mod\{N_{sub}\} + \{j\} \mod\{N_1\}$$

If $K_{SB} > N_{sub}/2$, $$i = N_1 \cdot \left\{ \left\lceil \frac{N_{sub}}{N_{sub} - K_{SB}} \right\rceil \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right\}$$

$$\mod\{N_{sub}\} + \{j + L_{MB}\}\mod\{N_1\}$$

$PRU_{MB}[k] = PRU[i], k = 0, 1, \ldots, L_{MB} - 1$      [Formula 10]

Yet, if $K_{SB} \leq N_{sub}/2$, $$i = \begin{cases} N_1 \cdot \left\{ \left\lceil \frac{N_{sub}}{K_{SB}} \right\rceil \cdot \left\lfloor \frac{k + L_{SB}}{N_1} \right\rfloor + \left\lfloor \left\lfloor \frac{k + L_{SB}}{N_1} \right\rfloor \cdot \frac{GCD(N_{sub}, \lceil N_{sub}/K_{SB} \rceil)}{N_{sub}} \right\rfloor \right\} & K_{SB} > 0 \\ \mod\{N_{sub}\} + \{k + L_{SB}\}\mod\{N_1\} & \\ k & K_{SB} = 0 \end{cases}$$

If $K_{SB} > N_{sub}/2$, $$i = N_1 \cdot \left\{ \left\lceil \frac{N_{sub}}{(N_{sub} - K_{SB})} \right\rceil \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right\} \mod\{N_{sub}\} +$$

$$\{k\}\mod\{N_1\}$$

Meanwhile, as modified examples for Formula 9 and Formula 10, it is able to define $K_{SB\_tp}$, $L_{SB\_tp}$ and $L_{MB\_tp}$ in Formula 11.

$K_{SB\_tp} = \min(K_{SB}, N_{sub} - K_{SB})$ $L_{SB\_tp} = K_{SB} * N_1$ $L_{MB\_tp} = N_{PRU} - L_{SB\_tp}$      [Formula 11]

In this case, $PRU_{SB\_tp}[j]$ and $PRU_{MB\_tp}[k]$ are defined as Formula 12 and Formula 13, respectively.

$PRU_{SB\_tp}[j] = PRU[i], j = 0, 1, \ldots, L_{SB\_tp} - 1$      [Formula 12]

Yet, $$i = N_1 \cdot \left\{ \left\lceil \frac{N_{sub}}{K_{SB\_tp}} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/K_{SB\_tp} \rceil)}{N_{sub}} \right\rfloor \right\} \mod\{N_{sub}\} + \{j\}\mod\{N_1\},$$

or $$i = N_1 \cdot \left\{ \left\lceil \frac{N_{sub}}{K_{SB\_tp}} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lfloor N_{sub}/K_{SB\_tp} \rfloor)}{N_{sub}} \right\rfloor \right\} \mod\{N_{sub}\} + \{j\}\mod\{N_1\}$$

$PRU_{MB\_tp}[k] = PRU[i], k = 0, 1, \ldots, L_{SB\_tp} - 1$      [Formula 13]

Yet, $$i = \begin{cases} N_1 \cdot \left\{ \left\lceil \frac{N_{sub}}{K_{SB\_tp}} \right\rceil \cdot \left\lfloor \frac{k + L_{SB\_tp}}{N_1} \right\rfloor + \left\lfloor \left\lfloor \frac{k + L_{SB\_tp}}{N_1} \right\rfloor \cdot \frac{GCD(N_{sub}, \lceil N_{sub}/K_{SB\_tp} \rceil)}{N_{sub}} \right\rfloor \right\} & \\ \mod\{N_{sub}\} + \{k + L_{SB\_tp}\}\mod\{N_1\}; K_{SB\_tp} > 0 & \\ k; & K_{SB\_tp} = 0, \end{cases}$$

or $$i = \begin{cases} N_1 \cdot \left\{ \left\lceil \frac{N_{sub}}{K_{SB\_tp}} \right\rceil \cdot \left\lfloor \frac{k + L_{SB\_tp}}{N_1} \right\rfloor + \left\lfloor \left\lfloor \frac{k + L_{SB\_tp}}{N_1} \right\rfloor \cdot \frac{GCD(N_{sub}, \lfloor N_{sub}/K_{SB\_tp} \rfloor)}{N_{sub}} \right\rfloor \right\} & \\ \mod\{N_{sub}\} + \{k + L_{SB\_tp}\}\mod\{N_1\}; K_{SB\_tp} > 0 & \\ k; & K_{SB\_tp} = 0 \end{cases}$$

If Formula 12 and Formula 13 are utilized, Table 8 can be converted to Table 9.

TABLE 9

```
If K_SB_tp<=K_SB,
    PRU_SB[j]=PRU_SB_tp[j]; j=0, 1,..., L_SB_tp-1
    PRU_MB[k]=PRU_MB_tp[k]; k=0, 1,..., L_MB_tp-1
Else
    PRU_SB[j]=PRU_MB_tp[j]; j=0, 1,..., L_MB_tp-1
    PRU_MB[k]=PRU_SB_tp[k]; k=0, 1,..., L_SB_tp-1
End
```

Meanwhile, a rule for subband/miniband mapping, which does not need the term GCD (x, y), can be provided as Formula 14 and Formula 15 by modifying Formula 9 and Formula 10. In particular, Formula 14 relates to a case of $K_{SB} \leq N_{sub}/2$ and Formula 15 relates to a case of $K_{SB} > N_{sub}/2$.

$$PRU_{SB}[j]=PRU[i], j=0, 1, \ldots, L_{SB}-1 \quad \text{[Formula 14]}$$

Yet, $$i = N_1 \cdot \left\lfloor \frac{N_{sub}}{K_{SB}} \right\rfloor \cdot \left\lfloor \frac{j}{N_1} \right\rfloor + j \bmod N_1$$

$$PRU_{MB}[k]=PRU[i], k=0, 1, \ldots, L_{MB}-1$$

In Formula 14, PRU[i] is determined by renumbering the rest of resources, which are not allocated to the $PRU_{SB}$, from PRU[0] to $PRU[L_{MB}-1]$.

$$PRU_{MB}[j]=PRU[i], k=0, 1, \ldots, L_{MB}-1 \quad \text{[Formula 15]}$$

Yet, $$i = N_1 \cdot \left\lfloor \frac{N_{sub}}{(N_{sub} - K_{SB})} \right\rfloor \cdot \left\lfloor \frac{k}{N_1} \right\rfloor + k \bmod N_1$$

$$PRU_{SB}[j]=PRU[i], j=0, 1, \ldots, L_{SB}-1$$

In Formula 15, PRU[i] is determined by renumbering the rest of resources, which are not allocated to the $PRU_{MB}$, from PRU[0] to $PRU[L_{SB}-1]$.

Finally, if offset value is applied to Formula 14 and Formula 15, it results in Formula 16 and Formula 17. Likewise, Formula 16 relates to a case of $K_{SB} \leq N_{sub}/2$ and Formula 17 relates to a case of $K_{s8} > N_{sub}/2$.

$$PRU_{SB}[j]=PRU[i], j=0, 1, \ldots, L_{SB}-1$$

Yet, $$i = N_1 \cdot \left\lfloor \frac{N_{sub}}{K_{SB}} \right\rfloor \cdot \left\lfloor \frac{j}{N_1} \right\rfloor + j \bmod N_1 + N_1 \cdot \left\lfloor \frac{\left(N_{sub} - \left\lfloor \frac{N_{sub}}{K_{SB}} \right\rfloor \cdot (K_{SB} - 1) - 1\right)}{2} \right\rfloor$$

$$PRU_{MB}[k]=PRU[i], k=0, 1, \ldots, L_{MB}-1$$

In Formula 16, PRU[i] is determined by renumbering the rest of resources, which are not allocated to the $PRU_{SB}$, from PRU[0] to $PRU[L_{MB}-1]$.

$$PRU_{MB}[j]=PRU[i], k=0, 1, \ldots, L_{MB}-1 \quad \text{[Formula 17]}$$

Yet, $$i = N_1 \cdot \left\lfloor \frac{N_{sub}}{(N_{sub} - K_{SB})} \right\rfloor \cdot \left\lfloor \frac{k}{N_1} \right\rfloor + k \bmod N_1 +$$

$$N_1 \cdot \left\lfloor \frac{\left(\left(N_{sub} - \left\lfloor \frac{N_{sub}}{(N_{sub} - K_{SB})} \right\rfloor\right) \cdot ((N_{sub} - K_{SB}) - 1) - 1\right)}{2} \right\rfloor$$

$$PRU_{SB}[j]=PRU[i], j=0, 1, \ldots, L_{SB}-1$$

In Formula 17, PRU[i] is determined by renumbering the rest of resources, which are not allocated to the $PRU_{MB}$, from PRU[0] to $PRU[L_{SB}-1]$.

Although $$N_1 \cdot \left\lfloor \frac{\left(N_{sub} - \left\lfloor \frac{N_{sub}}{K_{SB}} \right\rfloor\right) \cdot (K_{SB} - 1) - 1}{2} \right\rfloor$$

is applied as the offset value to Formula 16, $$N_1 \cdot \left\lfloor \frac{\left(N_{sub} - \left\lfloor \frac{N_{sub}}{K_{SB}} \right\rfloor\right) \cdot (K_{SB} - 1)}{2} \right\rfloor \text{ or }$$

$$N_1 \cdot \left\lfloor \frac{\left(\left(N_{sub} - \left\lfloor \frac{N_{sub}}{K_{SB}} \right\rfloor\right) \cdot (K_{SB} - 1) - 1\right)}{2} \right\rfloor$$

can be applied as offset value.

To correspond to this, $$N_1 \cdot \left\lfloor \frac{\left(\left(N_{sub} - \left\lfloor \frac{N_{sub}}{(N_{sub} - K_{SB})} \right\rfloor\right) \cdot ((N_{sub} - K_{SB}) - 1) - 1\right)}{2} \right\rfloor$$

or $$N_1 \cdot \left\lfloor \frac{\left(\left(N_{sub} - \left\lfloor \frac{N_{sub}}{(N_{sub} - K_{SB})} \right\rfloor\right) \cdot ((N_{sub} - K_{SB}) - 1)\right)}{2} \right\rfloor$$

can be applied as the offset value $$N_1 \cdot \left\lfloor \frac{\left((N_{sub} - \left\lfloor \frac{N_{sub}}{(N_{sub} - K_{SB})} \right\rfloor) \cdot ((N_{sub} - K_{SB}) - 1) - 1\right)}{2} \right\rfloor$$

in Formula 17.

Figure 12:
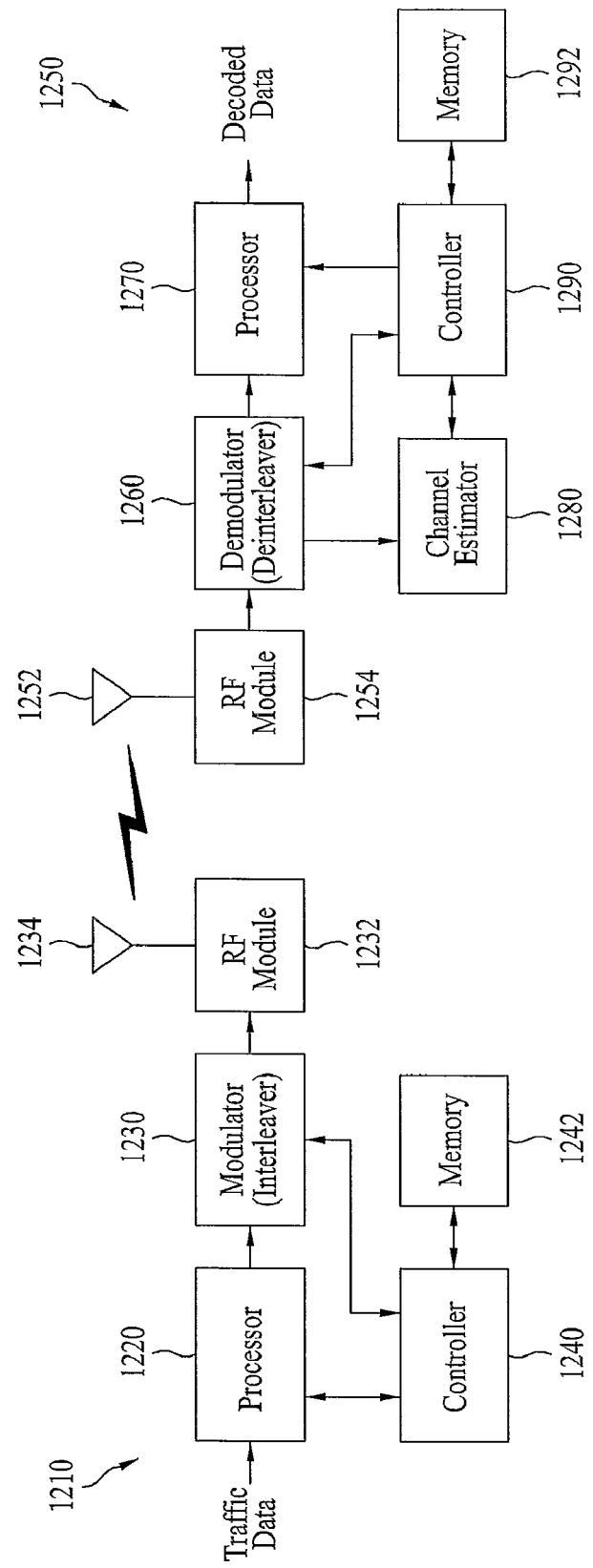
FIG. 12 is a block diagram of an example for a transmitter and receiver according to one embodiment of the present invention.

FIG. 12 is a block diagram for an example of a transmitter and receiver according to one embodiment of the present invention. In downlink, a transmitter 1210 is a part of a base station and a receiver 1250 is a part of a mobile station. In uplink, a transmitter 1210 is a part of a mobile station and a receiver 1250 is a part of a base station.

Referring to FIG. 12, in a transmitter 1210, a processor 1220 generates data symbols by performing encoding, interleaving and symbol mapping on data e.g., traffic data and signaling). And, the pilot processor 1220 generates pilot symbols and then multiplexes data and pilot symbols with each other. A modulator 1230 generates transmission symbols according to a wireless access scheme. The wireless access scheme includes one of FDMA, TDMA, CDMA, SC-FDMA, MC-FDMA, OFDMA and combinations thereof. And, the modulator 1230 enables data to be transmitted by being distributed in a frequency region using one of various permutation schemes proposed by embodiments of the present invention. A radio frequency (RF) module 1232 generates an RF signal from a transmission symbol through an antenna 1234 by performing signal processing (e.g., analog conversion, amplification, filtering and frequency uplink transform).

The receiver 1250 receives a signal transmitted by the transmitter 1210 via an antenna 1252 and then forwards it to an RF module 1254. The RF module 1254 provides input samples by performing signal processing (e.g., filtering, amplification, frequency downlink transform, digitalization, etc.) on the received signal.

A demodulator 1260 provides a data value and a pilot value by demodulating the input samples. A channel estimator 1280 derives a channel estimation value based on the received pilot values. And, the demodulator 1260 performs data detection (or equalization) on the received data values using the channel estimation value and then provides data symbol estimation values for the transmitter 1210. Moreover, the demodulator 1260 is able to rearrange the data distributed in frequency and time domains into data arranged in original order by performing operations reverse to the corresponding one of the various permutation schemes proposed by the embodiments of the present invention. A processor 1270 performs symbol demapping, deinterleaving and decoding on the data symbol estimation values and then provides decoded data.

Generally, the processings by the demodulator 1260 and the processor 1270 in the receiver 1250 are mutually supplemented with the processings of the modulator 1230 and the Processor 1220 in the transmitter, respectively.

A controller/processor 1240/1290 monitors and controls operations of the modules existing in the transmitter/receiver 1210/1250. And, program codes and data for the transmitter/receiver 1210/1250 are stored in a memory 1242/1292. The modules exemplarily shown in FIG. 12 are provided for the description only.

The transmitter and/or the receiver can further include necessary module(s). The modules/functions are omitted in part or can be separated into different modules. And, at least two modules can be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the terminal. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the terminal may be replaced with terms such as user equipment (UE), mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Accordingly, the present invention is applicable to a wireless communication system, and more particularly, to a wireless mobile communication device used for cellular systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for mapping a system bandwidth to subbands and minibands in a base station of a wireless communication system, the method comprising the steps of:

dividing the system bandwidth into a plurality of physical resource units (PRUs); and mapping the plurality of the physical resource units to at least one subband physical resource unit ($PRU_{SB}$) and at least one miniband physical resource unit ($PRU_{MB}$), wherein the mapping is based on first interval between contiguous resource units which include a predetermined number of contiguous PRUs and a second interval greater than the first interval, and is based on a greatest common divisor between a maximum number of the contiguous resource units and the first interval between the contiguous resource units, and wherein the first interval between the contiguous resource units is a roundup value of a value resulting from dividing the maximum number of the contiguous resource units by the number of the contiguous resource units to allocate to the minibands.

2. The method of claim 1, wherein the predetermined number is a number ($N_1$) of the PRU constructing one subband.

3. The method of claim 2, wherein the mapping to the subband physical resource unit ($PRU_{SB}$) is performed by below Formula 1:

$$PRU_{SB}[j]=PRU[i]; j=0, 1, \ldots, L_{SB}-1,$$

where $$i = N_1 \cdot \left\{ \left( \left\lceil \frac{N_{sub}}{N_{sub} - K_{SB}} \right\rceil \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right) \mod\{N_{sub}\} + \{j + L_{MB}\} \mod\{N_1\} \right\},$$

the $N_1$ is the number of the PRU constructing one subband,
the $N_{sub}$ is the maximum number of subbands,
the $K_{SB}$ is the number of allocating subbands,
the $GCD(x, y)$ is a greatest common divisor of x and y, and
the $L_{MB}$ is the number of the PDU included in allocating minibands.

4. The method of claim 2, wherein the mapping to the miniband physical resource unit ($PRU_{MB}$) is performed by below Formula 2:

$$PRU_{MB}[k]=PRU[i]; k=0, 1, \ldots, L_{MB}-1,$$

where $$i = N_1 \cdot \left\{ \left( \left\lceil \frac{N_{sub}}{N_{sub} - K_{SB}} \right\rceil \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right) \mod\{N_{sub}\} + \{k\} \mod\{N_1\} \right\},$$

the $N_1$ is the number of the PRU constructing one subband, the $N_{sub}$ is the maximum number of subbands,
the $K_{SB}$ is the number of allocating subbands, and
the $GCD(x, y)$ is a greatest common divisor of x and y.

5. The method of claim 3, wherein the term $$\left\lceil \frac{N_{sub}}{N_{sub} - K_{SB}} \right\rceil$$

is the first interval between the contiguous resource units.

6. The method of claim 4, wherein the term $$\left\lceil \frac{N_{sub}}{N_{sub} - K_{SB}} \right\rceil$$

is the first interval between the contiguous resource units.

7. The method of claim 1, wherein the number of the PRU constructing one subband is different from the number of the PRU constructing one miniband.

8. A base station, comprising:
a processor configured to divide a system bandwidth into a plurality of physical resource units (PRUs) and to map the plurality of the physical resource units to at least one subband physical resource unit ($PRU_{SB}$) and at least one miniband physical resource unit ($PRU_{MB}$); and
a transmitting module configured to transmit a downlink signal to a terminal using the at least one subband physical resource unit ($PRU_{SB}$) and the at least one miniband physical resource unit ($PRU_{MB}$),
wherein the mapping is based on first interval between contiguous resource units which include a predetermined number of contiguous PRUs and a second interval greater than the first interval and is based on a greatest common divisor between a maximum number of the contiguous resource units and the first interval between the contiguous resource units, and
wherein the first interval between the contiguous resource units is a roundup value of a value resulting from dividing the maximum number of the contiguous resource units by the number of the contiguous resource units to allocate to the minibands.

9. The base station of claim 8, wherein the predetermined number is a number ($N_1$) of the PRU constructing one subband.

10. The base station of claim 9, wherein the mapping to the subband physical resource unit ($PRU_{SB}$) is performed by below Formula 1:

$$PRU_{MB}[k]=PRU[i]; k=0, 1, \ldots, L_{MB}-1,$$

where $$i = N_1 \cdot \left\{ \left( \left\lceil \frac{N_{sub}}{N_{sub} - K_{SB}} \right\rceil \cdot \left\lfloor \frac{j + L_{MB}}{N_1} \right\rfloor + \left\lfloor \left\lfloor \frac{j + L_{MB}}{N_1} \right\rfloor \cdot \frac{GCD(N_{sub}, \lceil N_{sub}/(N_{sub} - K_{SB}) \rceil)}{N_{sub}} \right\rfloor \right) \mod\{N_{sub}\} + \{j + L_{MB}\} \mod\{N_1\} \right\},$$

the $N_1$ is the number of the PRU constructing one subband,
the $N_{sub}$ is the maximum number of subbands,
the $K_{SB}$ is the number of allocating subbands, the $GCD(x, y)$ is a greatest common divisor of x and y, and the $L_{MB}$ is the number of the PDU included in allocating minibands.

11. The base station of claim 9, wherein the mapping to the miniband physical resource unit ($PRU_{MB}$) is performed by below Formula 2:

$$PRU_{MB}[k]=PRU[i]; k=0, 1, \ldots, L_{MB}-1,$$

where $$i = N_1 \cdot \left\{ \left( \left\lceil \frac{N_{sub}}{N_{sub} - K_{SB}} \right\rceil \cdot \left\lfloor \frac{k}{N_1} \right\rfloor + \left\lfloor \left\lfloor \frac{k}{N_1} \right\rfloor \cdot \frac{GCD(N_{sub}, \lceil N_{sub}/(N_{sub} - K_{SB}) \rceil)}{N_{sub}} \right\rfloor \right) \mod\{N_{sub}\} + \{k\} \mod\{N_1\} \right\},$$

the $N_1$ is the number of the PRU constructing one subband,
the $N_{sub}$ is the maximum number of subbands,
the $K_{SB}$ is the number of allocating subbands, and
the $GCD(x, y)$ is a greatest common divisor of x and y.

12. The base station of claim 10, wherein the term $$\left\lceil \frac{N_{sub}}{N_{sub} - K_{SB}} \right\rceil$$

is the first interval between the contiguous resource units.

13. The base station of claim 11, wherein the term $$\left\lceil \frac{N_{sub}}{N_{sub} - K_{SB}} \right\rceil$$

is the first interval between the contiguous resource units.

14. The base station of claim 8, wherein the number of the PRU constructing one subband is different from the number of the PRU constructing one miniband.

* * * * *